United States Patent
Ju et al.

(10) Patent No.: US 9,773,469 B2
(45) Date of Patent: Sep. 26, 2017

(54) DATA PROCESSING APPARATUS WITH ADAPTIVE COMPRESSION/DE-COMPRESSION ALGORITHM SELECTION FOR DATA COMMUNICATION OVER DISPLAY INTERFACE AND RELATED DATA PROCESSING METHOD

(71) Applicant: MEDIATEK INC., Hsin-Chu (TW)

(72) Inventors: Chi-Cheng Ju, Hsinchu (TW); Tsu-Ming Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 536 days.

(21) Appl. No.: 13/953,752

(22) Filed: Jul. 30, 2013

(65) Prior Publication Data

US 2014/0098110 A1    Apr. 10, 2014

Related U.S. Application Data

(60) Provisional application No. 61/711,319, filed on Oct. 9, 2012, provisional application No. 61/712,949, filed on Oct. 12, 2012.

(51) Int. Cl.
*H04N 19/10* (2014.01)
*G09G 5/00* (2006.01)
(Continued)

(52) U.S. Cl.
CPC ............. *G09G 5/006* (2013.01); *G06F 3/14* (2013.01); *G06T 1/20* (2013.01); *G06T 9/00* (2013.01);
(Continued)

(58) Field of Classification Search
CPC combination set(s) only.
See application file for complete search history.

(56) References Cited

U.S. PATENT DOCUMENTS 4,424,565 A    1/1984  Larson
5,553,160 A    9/1996  Dawson
(Continued)

FOREIGN PATENT DOCUMENTS

CN    1359048 A    7/2002
CN    1610408 A    4/2005
(Continued)

OTHER PUBLICATIONS

English translation of CN 1610408, Qicheng.*
(Continued)

*Primary Examiner* — Sath V Perungavoor
*Assistant Examiner* — Janese Duley
(74) *Attorney, Agent, or Firm* — Oblon, McClelland, Maier & Neustadt, L.L.P.

(57) ABSTRACT

A data processing apparatus has a compressor and an output interface. The compressor generates an output display data according to an input display data. The output interface packs the output display data into an output bitstream, and outputs the output bitstream to another data processing apparatus via a display interface. The display interface is a display serial interface (DSI) standardized by a Mobile Industry Processor Interface (MIPI) or an embedded display port (eDP) standardized by a Video Electronics Standards Association (VESA). In addition, the compressor adaptively adjusts a compression algorithm according to context characteristics in the input display data, power supply status, operational status of a storage device, image capture characteristic, configuration of the another data processing apparatus, and/or compression algorithm supported by the another data processing apparatus. Further, the another data processing apparatus adaptively adjusts a de-compression algorithm according to a compression algorithm supported by the compressor.

29 Claims, 15 Drawing Sheets

(51) Int. Cl.
| | | |
|---|---|---|
| *G06T 1/20* | (2006.01) | |
| *G06F 3/14* | (2006.01) | |
| *G06T 9/00* | (2006.01) | |
| *H04N 19/172* | (2014.01) | |
| *H04N 19/12* | (2014.01) | |
| *H04N 19/136* | (2014.01) | |
| *H04N 19/156* | (2014.01) | |
| *H04N 19/164* | (2014.01) | |

(52) U.S. Cl.
CPC ............ *G09G 5/005* (2013.01); *H04N 19/10* (2014.11); *H04N 19/12* (2014.11); *H04N 19/136* (2014.11); *H04N 19/156* (2014.11); *H04N 19/164* (2014.11); *H04N 19/172* (2014.11); *G09G 2330/021* (2013.01); *G09G 2340/02* (2013.01); *G09G 2340/04* (2013.01); *G09G 2350/00* (2013.01); *G09G 2370/08* (2013.01); *G09G 2370/10* (2013.01)

(56) References Cited

U.S. PATENT DOCUMENTS

| | | | |
|---|---|---|---|
| 5,760,760 | A | 6/1998 | Helms |
| 5,943,508 | A | 8/1999 | Penney |
| 6,031,929 | A | 2/2000 | Maitz |
| 6,353,699 | B1 | 3/2002 | Schwab |
| 6,704,022 | B1 | 3/2004 | Aleksic |
| 6,914,637 | B1 | 7/2005 | Wolf |
| 7,822,278 | B1 | 10/2010 | Hobbs |
| 7,903,119 | B2 | 3/2011 | Hochmuth |
| 7,930,436 | B1 | 4/2011 | Znosko |
| 8,112,513 | B2 * | 2/2012 | Margulis .................. G06F 3/14 709/224 |
| 8,145,813 | B2 | 3/2012 | Ho |
| 8,179,971 | B1 | 5/2012 | Gough |
| 8,363,969 | B1 | 1/2013 | Wang |
| 8,599,316 | B2 * | 12/2013 | Deever ............ G06F 17/30784 348/590 |
| 2002/0030675 | A1 | 3/2002 | Kawai |
| 2002/0057265 | A1 | 5/2002 | Tamura |
| 2002/0105905 | A1 | 8/2002 | Boyle |
| 2003/0234799 | A1 | 12/2003 | Lee |
| 2004/0103216 | A1 | 5/2004 | Lane |
| 2005/0135682 | A1 | 6/2005 | Abrams |
| 2005/0276496 | A1 | 12/2005 | Molgaard |
| 2006/0017715 | A1 | 1/2006 | Kimura |
| 2006/0037051 | A1 | 2/2006 | McDowell |
| 2006/0093230 | A1 | 5/2006 | Hochmuth |
| 2006/0117371 | A1 | 6/2006 | Margulis |
| 2006/0159358 | A1 | 7/2006 | Yi |
| 2006/0215755 | A1 * | 9/2006 | Ju ........................ H04N 19/172 375/240.12 |
| 2007/0081587 | A1 * | 4/2007 | Raveendran ........... H04N 5/144 375/240.1 |
| 2007/0255926 | A1 | 11/2007 | Chuang |
| 2009/0129478 | A1 | 5/2009 | Meroth |
| 2009/0322713 | A1 | 12/2009 | Furihata |
| 2010/0073574 | A1 | 3/2010 | Nakajima |
| 2010/0158104 | A1 | 6/2010 | Lin |
| 2010/0182402 | A1 | 7/2010 | Nakajima |
| 2010/0328425 | A1 | 12/2010 | Nagaraj |
| 2011/0075729 | A1 | 3/2011 | Dane |
| 2011/0249723 | A1 | 10/2011 | Wasily |
| 2012/0027317 | A1 | 2/2012 | Choi |
| 2012/0068952 | A1 | 3/2012 | Slaby |
| 2012/0072044 | A1 | 3/2012 | Slaby |
| 2012/0072157 | A1 | 3/2012 | Alameh |
| 2012/0134410 | A1 | 5/2012 | Kawasaki |
| 2012/0163181 | A1 * | 6/2012 | Xue ...................... H04W 52/24 370/241 |
| 2012/0207155 | A1 | 8/2012 | Nelogal |
| 2013/0088373 | A1 | 4/2013 | Takano |
| 2013/0127980 | A1 | 5/2013 | Haddick |
| 2013/0179659 | A1 | 7/2013 | Seo |
| 2013/0293121 | A1 | 11/2013 | Viacheslav |
| 2013/0322517 | A1 | 12/2013 | Zurpal |

FOREIGN PATENT DOCUMENTS

| | | |
|---|---|---|
| CN | 1838772 A | 9/2006 |
| CN | 101035086 A | 9/2007 |
| CN | 101237301 A | 8/2008 |
| CN | 101355364 A | 1/2009 |
| CN | 101378384 A | 3/2009 |
| CN | 101553795 A | 10/2009 |
| CN | 101616318 A | 12/2009 |
| CN | 101669361 A | 3/2010 |
| CN | 101682745 A | 3/2010 |
| CN | 101426132 B | 7/2010 |
| CN | 101803382 A | 8/2010 |
| CN | 101835197 A | 9/2010 |
| CN | 101904751 A | 12/2010 |
| CN | 201758429 U | 3/2011 |
| CN | 102394822 A | 3/2012 |
| CN | 101340575 B | 4/2012 |
| CN | 102651709 A | 8/2012 |
| CN | 102939630 A | 2/2013 |

OTHER PUBLICATIONS

CN 1610408 A english translation.*
"International Search Report" mailed on Dec. 19, 2013 for International application No. PCT/CN2013/083118, International filing date: Sep. 9, 2013.
"International Search Report" mailed on Dec. 19, 2013 for International application No. PCT/CN2013/083653, International filing date: Sep. 17, 2013.
"International Search Report" mailed on Dec. 5, 2013 for International application No. PCT/CN2013/083061, International filing date: Sep. 6, 2013.
"International Search Report" mailed on Jan. 2, 2014 for International application No. PCT/CN2013/084496, International filing date: Sep. 27, 2013.
"International Search Report" mailed on Jan. 2, 2014 for International application No. PCT/CN2013/084489, International filing date: Sep. 27, 2013.
"International Search Report" mailed on Dec. 26, 2013 for International application No. PCT/CN2013/083739, International filing date: Sep. 18, 2013.
Combined Chinese Office Action and Search Report dated Dec. 6, 2016 in Patent Application No. 201380052841.0 (with English Translation of Category of Cited Documents).

* cited by examiner

| Type of Algorithm | Complexity | Power | Ratio M | Compression Efficiency |
|---|---|---|---|---|
| Compression Algorithm 1 | 5 (Highest) | 5 (Highest) | 1/8 | 5 (Highest) |
| Compression Algorithm 2 | 4 | 4 | 1/4 | 4 |
| Compression Algorithm 3 | 3 | 3 | 1/4 | 3 |
| Compression Algorithm 4 | 2 | 2 | 1/2 | 2 |
| Compression Algorithm 5 | 1 (Lowest) | 1 (Lowest) | 1/2 | 1 (Lowest) |

FIG. 2

DATA PROCESSING APPARATUS WITH ADAPTIVE COMPRESSION/DE-COMPRESSION ALGORITHM SELECTION FOR DATA COMMUNICATION OVER DISPLAY INTERFACE AND RELATED DATA PROCESSING METHOD

CROSS REFERENCE TO RELATED APPLICATIONS

This application claims the benefit of U.S. provisional application No. 61/711,319 (filed on Oct. 9, 2012) and U.S. provisional application No. 61/712,949 (filed on Oct. 12, 2012). The entire contents of the related applications are incorporated herein by reference.

BACKGROUND

The disclosed embodiments of the present invention relate to transmitting and receiving display data over a display interface, and more particularly, to a data processing apparatus with adaptive compression/de-compression algorithm selection for data communication over a display interface and related data processing method.

A display interface is disposed between a first chip and a second chip to transmit display data from the first chip to the second chip for further processing. For example, the first chip may be a host application processor, and the second chip may be a driver integrated circuit (IC). The display data may include image data, video data, graphic data, and/or OSD (on-screen display) data. Besides, the display data may be single view data for two-dimensional (2D) display or multiple view data for three-dimensional (3D) display. When a display panel supports a higher display resolution, 2D/3D display with higher resolution can be realized. Hence, the display data transmitted over the display interface would have a larger data size/data rate, which increases the power consumption of the display interface inevitably. If the host application processor and the driver IC are both located at a portable device (e.g., a smartphone) powered by a battery device, the battery life is shortened due to the increased power consumption of the display interface. Thus, there is a need for an innovative design which can effectively reduce the power consumption of the display interface.

SUMMARY

In accordance with exemplary embodiments of the present invention, a data processing apparatus with adaptive compression/de-compression algorithm selection for data communication over a display interface and related data processing method are proposed.

According to one aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA). In addition, the compressor adaptively adjusts a compression algorithm applied to the input display data according to context characteristics of the input display data.

According to another aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA). In addition, the compressor adaptively adjusts a compression algorithm applied to the input display data according to a power supply status.

According to another aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA). In addition, the compressor adaptively adjusts a compression algorithm applied to the input display data according to an operational status of a storage device.

According to another aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA). In addition, the compressor adaptively adjusts a compression algorithm applied to the input display data according to at least one image capture characteristic.

According to another aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream to another data processing apparatus via a display interface, wherein the display interface is a display serial interface (DSI) standardized by a Mobile Industry Processor Interface (MIPI) or an embedded display port (eDP) standardized by a Video Electronics Standards Association (VESA). In addition, the compressor adaptively adjusts a compression algorithm applied to the input display data according to a configuration of another data processing apparatus.

According to another aspect of the present invention, an exemplary data processing apparatus is disclosed. The exemplary data processing apparatus includes a compressor and an output interface. The compressor is arranged for receiving an input display data and generating an output display data according to the input display data. The output interface is arranged for packing the output display data into an output bitstream, and outputting the output bitstream to another data processing apparatus via a display interface, wherein the display interface is a display serial interface (DSI) standardized by a Mobile Industry Processor Interface (MIPI) or an embedded display port (eDP) standardized by a Video Electronics Standards Association (VESA). In addition, the compressor adaptively adjusts a compression algorithm applied to the input display data according to a de-compression algorithm supported by the another data processing apparatus.

According to another aspect of the present invention, an exemplary data processing apparatus is disclosed. The exemplary data processing apparatus includes an input interface and a de-compressor. The input interface is arranged for receiving an input bitstream from another data processing apparatus via a display interface, and un-packing the input bitstream into an input display data, wherein the display interface is a display serial interface (DSI) standardized by a Mobile Industry Processor Interface (MIPI) or an embedded display port (eDP) standardized by a Video Electronics Standards Association (VESA). The de-compressor is arranged for generating a de-compressed display data according to the input display data when the input display data is a compressed display data. In addition, the de-compressor adaptively adjusts a de-compression algorithm according to a compression algorithm employed by the another data processing apparatus.

According to another aspect of the present invention, an exemplary data processing method is disclosed. The exemplary data processing method includes at least the following steps: receiving an input display data; adaptively adjusts a compression algorithm according to context characteristics of the input display data; generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA).

According to another aspect of the present invention, an exemplary data processing method is disclosed. The exemplary data processing method includes at least the following steps: receiving an input display data; adaptively adjusting a compression algorithm according to a power supply status; generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA).

According to another aspect of the present invention, an exemplary data processing method is disclosed. The exemplary data processing method includes at least the following steps: receiving an input display data; adaptively adjusting a compression algorithm according to an operational status of a storage device; generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA).

According to another aspect of the present invention, an exemplary data processing method is disclosed. The exemplary data processing method includes at least the following steps: receiving an input display data; adaptively adjusting a compression algorithm according to at least one image capture characteristic; generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA).

According to another aspect of the present invention, an exemplary data processing method is disclosed. The exemplary data processing method includes at least the following steps: receiving an input display data; adaptively adjusting a compression algorithm according to a configuration of a data processing apparatus; generating an output display data according to the compression algorithm and the input display data; and packing the output display data into an output bitstream, and outputting the output bitstream to the data processing apparatus via a display interface, wherein the display interface is a display serial interface (DSI) standardized by a Mobile Industry Processor Interface (MIPI) or an embedded display port (eDP) standardized by a Video Electronics Standards Association (VESA).

According to another aspect of the present invention, an exemplary data processing method is disclosed. The exemplary data processing method includes at least the following steps: receiving an input display data; adaptively adjusting a compression algorithm according to a de-compression algorithm supported by a data processing apparatus; generating an output display data according to the compression algorithm and the input display data; and packing the output display data into an output bitstream, and outputting the output bitstream to the data processing apparatus via a display interface, wherein the display interface is a display serial interface (DSI) standardized by a Mobile Industry Processor Interface (MIPI) or an embedded display port (eDP) standardized by a Video Electronics Standards Association (VESA).

According to another aspect of the present invention, an exemplary data processing method is disclosed. The exemplary data processing method includes at least the following steps: receiving an input bitstream from a data processing apparatus via a display interface, and un-packing the input bitstream into an input display data, wherein the display interface is a display serial interface (DSI) standardized by a Mobile Industry Processor Interface (MIPI) or an embedded display port (eDP) standardized by a Video Electronics Standards Association (VESA); adaptively adjusting a de-compression algorithm according to a compression algorithm employed by the data processing apparatus; and when the input display data is a compressed display data, generating a de-compressed display data according to the input display data and the de-compression algorithm.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a table showing characteristics of different compression algorithms supported by the compressor shown in FIG. 1.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes applying data compression to a display data and then transmitting a compressed display data over a display interface. As the data size/data rate of the compressed display data is smaller than that of the original un-compressed display data, the power consumption of the display interface is reduced correspondingly.

Besides, the present invention further proposes an adaptive compression/de-compression scheme which is based on side information given by one or more signal processing elements (e.g., an image signal processor (ISP), a video/image codec, a graphic engine, a display processor, a driver IC, and a battery meter). This may allow the configuration of the compressor and the counterpart de-compressor to be adjusted in a static or dynamic way. In general, data compression is exploited to remove the information redundancy under a specific pixel size (i.e., a unit size of compression) and produce a compressed data constrained by a compression ratio. In a case where the compression ratio is equal to 0.5, the size of the compressed data is half of the size of the uncompressed data. As the compression performance is strongly related to some design factors such as the unit size of compression and the constrained compression ratio, the present invention therefore proposes using the adaptive compression scheme for enabling a compression algorithm selected from a plurality of candidate compression algorithms, where the selected compression algorithm most efficiently compresses the display data. Compared to a typical compression scheme using a fixed compression algorithm, the proposed adaptive compression scheme achieves better performance. Besides, the driver IC may refers to side information given by the application processor to adaptively select a de-compression algorithm compliant with the compression algorithm employed by the application processor. In this way, the compressed data stream from the application processor can be correctly de-compressed by the driver IC. Further details will be described as below.

Figure 1:
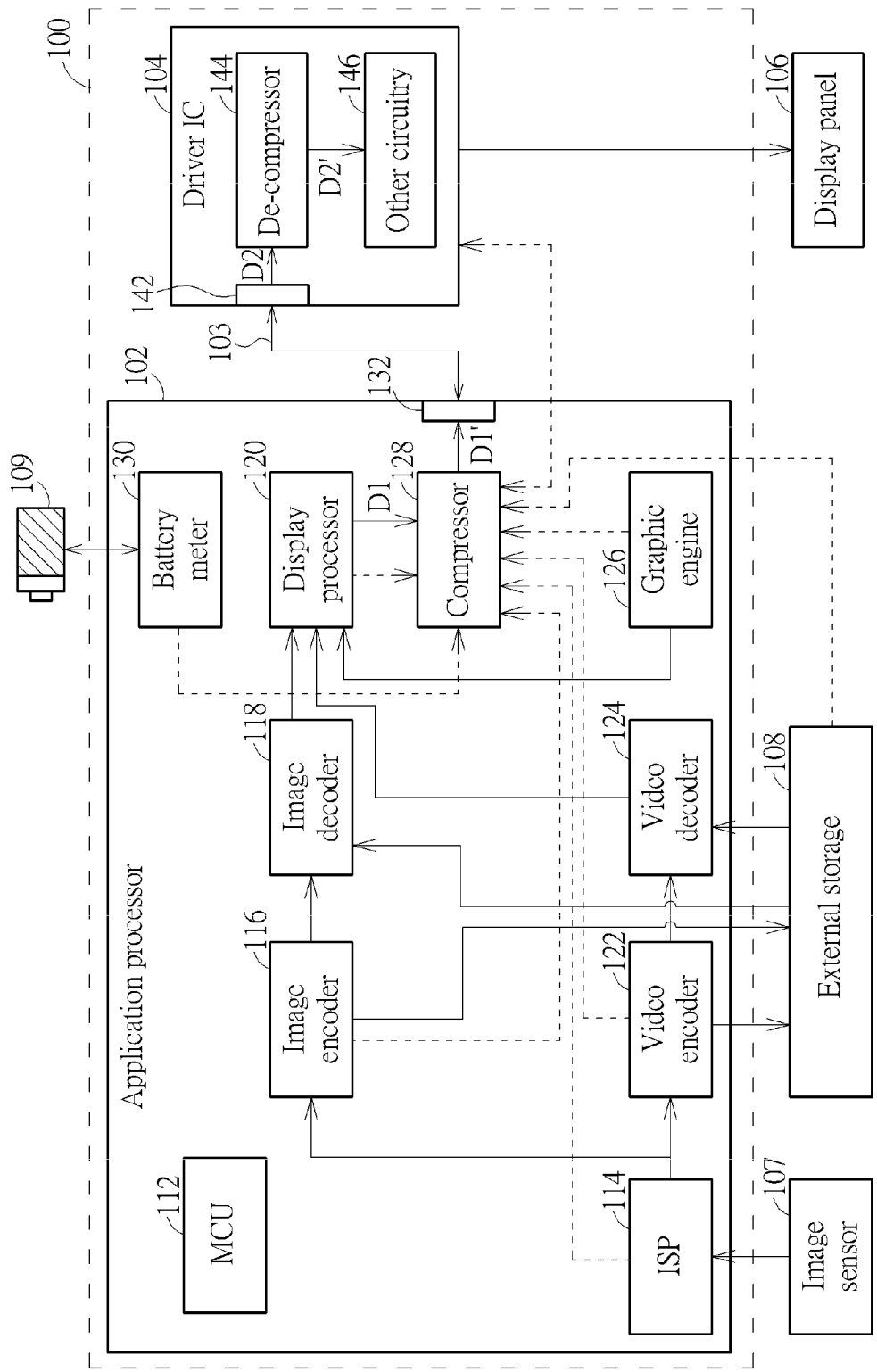
FIG. 1 is a block diagram illustrating a data processing system according to an embodiment of the present invention.

FIG. 1 is a block diagram illustrating a data processing system according to an embodiment of the present invention. The data processing system 100 includes a plurality of data processing apparatuses such as an application processor 102 and a driver integrated circuit (IC) 104. The application processor 102 and the driver IC 104 may be different chips, and the application processor 102 communicates with the driver IC 104 via a display interface 103. In this embodiment, the display interface 103 may be a display serial interface (DSI) standardized by a Mobile Industry Processor Interface (MIPI) or an embedded display port (eDP) standardized by a Video Electronics Standards Association (VESA).

The application processor 102 is coupled to the display interface 103, and supports un-compressed data transmission and compressed data transmission. When the application processor 102 is used to transmit un-compressed data to the driver IC 104, the application processor 102 generates an un-compressed display data, and transmits the un-compressed display data over the display interface 103. When the application processor 102 is used to transmit compressed data to the driver IC 104, the application processor 102 generates a compressed display data, and transmits the compressed display data over the display interface 103.

Regarding the driver IC 104, it is coupled to the display interface 103, and supports un-compressed data reception and compressed data reception. When the application processor 102 transmits the un-compressed data to the driver IC 104, the driver IC 104 is operated under a non-decompression mode to receive an un-compressed data from the display interface 103 and drive a display panel 106 according to the un-compressed display data. By way of example, the display panel 106 may be implemented using any 2D/3D display device (e.g. a retina display), and the pixel arrangement may be a rectangle layout, a triangle layout or a pentile layout. When the application processor 102 transmits the compressed data to the driver IC 104, the driver IC 104 is operated under a de-compression mode to receive a compressed display data from the display interface 103 and drive the display panel 106 according to a de-compressed display data derived from de-compressing the compressed display data. If there is no error introduced during the data transmission, the un-compressed data transmitted under the non-compression mode should be identical to the un-compressed data received under the non-decompression mode, and the compressed data transmitted under the compression mode should be identical to the compressed data received under the de-compression mode. As the present invention focuses on the adaptive compression and de-compression scheme for configuring the compressor and the de-compressor, further details directed to transmitting compressed/un-compressed display data from the application processor 102 to the driver IC 104 via the display interface 103 and driving the display panel 106 based on the compressed/un-compressed display data received from the display interface 103 are omitted here for brevity.

As shown in FIG. 1, the application processor 102 includes a micro control unit (MCU) 112, an image signal processor (ISP) 114, an image encoder 116, an image decoder 118, a display processor 120, a video encoder 122, a video decoder 124, a graphic engine 126, a compressor 128, a battery meter 130, and an output interface 132. The battery meter 130 is arranged to monitor the power status of a power source such as the battery capacity of a battery device 109. The MCU 112 serves as a display controller which controls the operation of the application processor 102. For example, the MCU 112 controls the application processor 102 to operate under the compression mode or the non-compression mode. Besides, the MCU 112 may program the compressor 128 to use a default compression algorithm. The ISP 114 is coupled to an image sensor 107, and serves as a backend processor for an image/video output of the image sensor 107. For example, the ISP 114 may be used to perform auto white balance (AWB), auto exposure (AE) and auto focus (AF). In a case where the image sensor 107 generates a single captured image to the ISP 114 under a photo mode, a processed image generated from the ISP 114 may be transmitted to the image encoder 116, and an encoded image is generated from the image encoder 116 to an external storage 108 such as a dynamic random access memory (DRAM). In another case where the image sensor 107 generates a video sequence composed of successive captured images to the ISP 114 under a video recording mode, a processed video generated from the ISP 114 may be transmitted to the video encoder 122, and an encoded video is generated from the video encoder 122 to the external storage 108.

The image decoder 118 receives an encoded image from the external storage 108, and generates a decoded image to the display processor 120. The video decoder 124 receives an encoded video from the external storage 108, and generates a decoded video to the display processor 120. However, it is possible that the single captured image/video sequence generated from the ISP 114 may be bypassed to the display processor 120 without additional encoding and decoding operations applied thereto. The graphic engine 126 generates graphic data (e.g., a 3D graphic image) to the display processor 120.

The display processor 120 may generate an input display data D1 based on one or more of the image data, video data, graphic data, etc. For example, the display processor 120 may combine video data, text data and graphic data to generate a display data of a frame, such that the display of the frame would show a graphic scene, a web-browsing text content, and a video playback content.

The compressor 128 is arranged to perform data compression upon the input display data D1 generated from the display processor 120, and accordingly generate an output display data D1', wherein the compressed display data (i.e., output display data D1') is packed/packetized into an output bitstream by the output interface 132 according to the transmission protocol of the display interface 103, and the output bitstream is transmitted to the driver IC 104 via the display interface 103.

The driver IC 104 includes an input interface 142, a de-compressor 144 and other circuitry 146. The input interface 142 receives an input bitstream from the display interface 103, and un-packs/un-packetizes the input bitstream into an input display data D2 which is a compressed display data when the application processor 102 is operated under a compression mode. In this embodiment, the de-compressor 144 is arranged to perform data de-compression upon the input display data D2, and accordingly generate a de-compressed display data D2'. The other circuitry 146 is arranged to drive the display panel 106 according to the de-compressed display data D2'.

In this embodiment, the compressor 128 supports a plurality of compression algorithms having different compression characteristics. Please refer to FIG. 2, which is a table showing characteristics of different compression algorithms supported by the compressor 128 shown in FIG. 1. A compression algorithm represents a set of coding tools so as to remove the data redundancy on the input display data D1. The coding tools may be any kind of compression methods developed by proprietary algorithms or specified by state-of-the-art video standards (e.g., MPEG-1/2/4, H.261/262/263/264, and HEVC) or image standards (e.g., PEG, JPEG-1s, JPEG-2000, JPEG-XR, PNG, and GIF). As shown in FIG. 2, these compression algorithms indicate different capability of compression performance in terms of compression ratio, compression efficiency, compression complexity, and power dissipation. Specifically, the compression efficiency is the ability of a compression algorithm to encode the input display data D1 at the lowest possible bit rate while maintaining a certain level of visual quality. There are two standard ways to measure the compression efficiency of a compression algorithm. One is to use an objective metric, such as a peak signal-to-noise ratio (PSNR). The other is to use a subjective assessment of video/image quality. If the compression efficiency of a compression algorithm is high, it means that the compression algorithm can preserve more input data information after compression is performed under a certain compression ratio. If the compression efficiency of a compression algorithm is low, it means that the compression algorithm will lose more input data information after compression is performed under a certain compression ratio. Hence, a high compression efficiency algorithm can preserve more input data information under a certain compression ratio, and the de-compressed display data can have better visual appearance and visual quality.

The compressor 128 is capable of adaptively adjusting a compression algorithm applied to the input display data D1 according to at least the side information shown as dotted lines in FIG. 1, where the side information may be provided by at least one of ISP 114, image encoder 116, video encoder 122, display processor 120, graphic engine 126, battery meter 130, and driver IC 104. As the compressor 128 refers to the side information to select an adequate compression algorithm from supported compression algorithms having different compression characteristics, the compression performance can be optimized. For better understanding of technical features of the present invention, several embodiments are illustrated as below.

Figure 3:
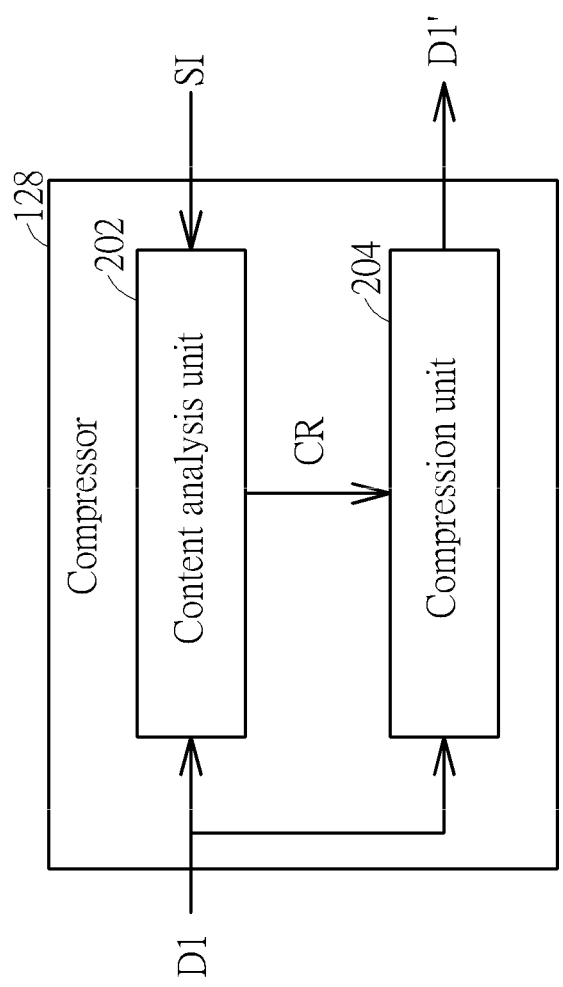
FIG. 3 is a diagram illustrating an embodiment of the compressor shown in FIG. 1.

In a first exemplary embodiment, the compressor 128 may adaptively adjust a compression algorithm applied to the input display data D1 according to context characteristics of the input display data D1. Please refer to FIG. 3, which is a diagram illustrating an embodiment of the compressor 128 shown in FIG. 1. As shown in FIG. 3, the compressor 128 includes a content analysis unit 202 and a compression unit 204. The content analysis unit 202 receives the input display data D1 and side information SI, where the side information SI may include information provided by the display processor 120, the image encoder 116, the video encoder 122, and/or the graphic engine 126. In one exemplary design, the content analysis unit 202 may be configured to analyze the input display data D1 to classify contents included in the input display data D1, and accordingly generate a content classification result CR. More specifically, the content analysis unit 202 could recognize the pixel data as text, graphic user interface (UI), video scene or image scene by detecting features in each received pixel unit of the input display data D1, where the size of the pixel unit to be compressed may be any positive value based on actual design requirement/consideration. The contents classified by the content analysis unit 202 may include a video content, an image content, a text content (i.e., a text-rich image content), and a graphic content. For example, the content analysis unit 202 could check if the received pixel unit is data generated by a video engine (e.g., video decoder 124) by comparing the characteristic of pixels with typical video data characteristics. If the characteristic of the pixels match the characteristic of video data, the content analysis unit 202 could classify the received pixel unit as data generated by the video engine (e.g., video decoder 124). In a similar way, the content analysis unit 202 could check if the received pixel unit is data generated by an image engine (e.g., image decoder 118) by comparing the characteristic of pixels with typical image data characteristics. Also, the content analysis unit 202 could check if the received pixel unit is data generated by the graphic engine 126 by matching it with several typical graphic data patterns such as monotonic repeated pixels, monotonic gradient color, and clear sharp edges. In another exemplary design, the content analysis unit 202 may refer to the side information SI to classify the contents of the input display data D1 into video contents generated by the video engine (e.g., video decoder 124), image contents are generated by the image engine (e.g., image decoder 118), and graphic contents generated by the graphic engine 126.

Figure 4:
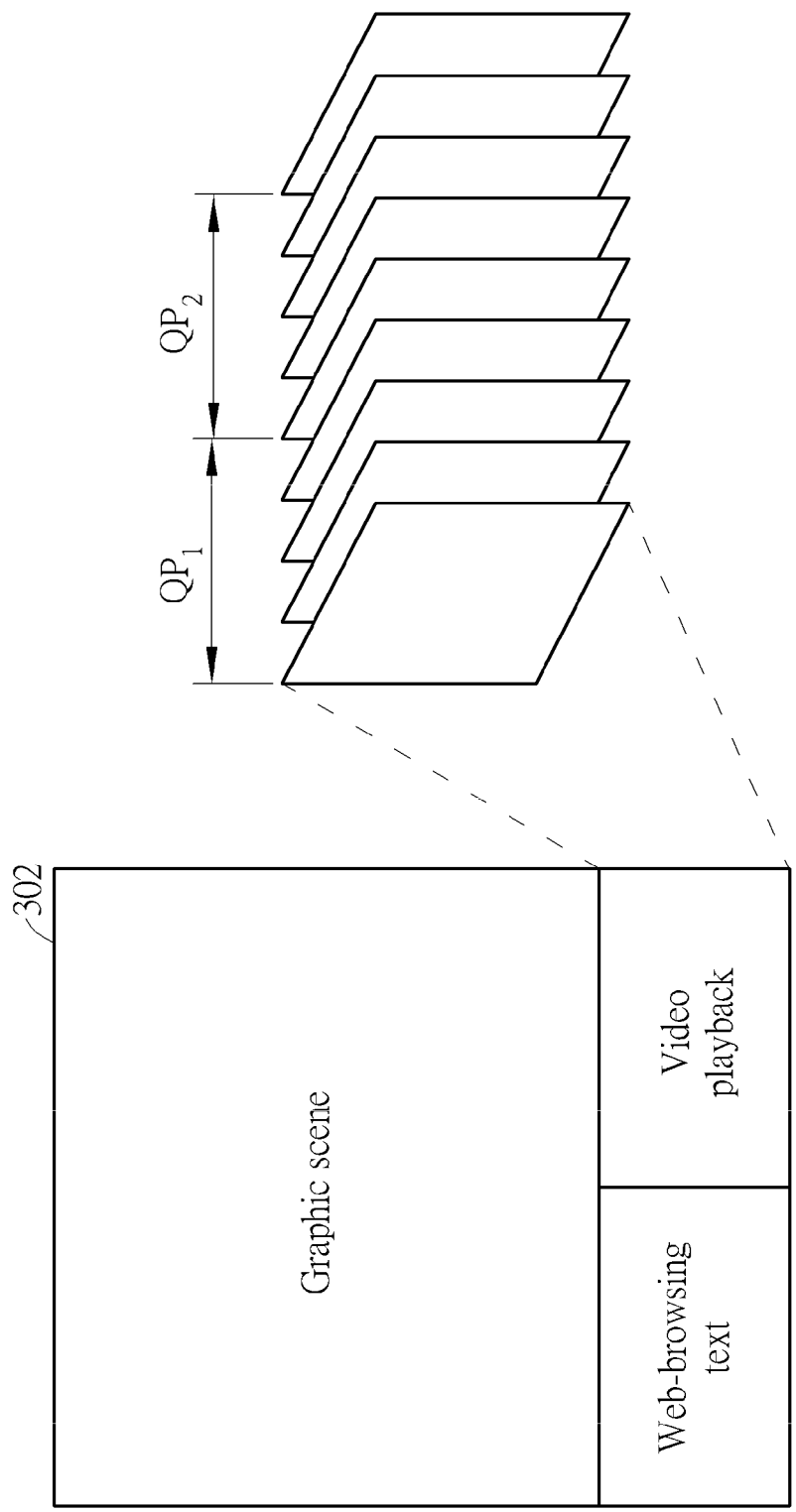
FIG. 4 is a diagram illustrating one frame included in the input display data.

The compression unit 204 is arranged for referring to the content classification result CR to adaptively adjust the compression algorithm employed. In this way, a content-aware compression based on the content classification result CR is achieved. FIG. 4 is a diagram illustrating one frame 302 included in the input display data D1. The content classification result CR indicates that the frame 302 include graphic contents at a top portion of the frame 302, text contents at the bottom-left portion of the frame 302, and video contents at the bottom-right portion of the frame 302. After the classification procedure, compression algorithms $N_1$ and $N_2$ are selected when the received pixel units are classified as graphic content and image content, respectively. Compression algorithms $N_3$ and $N_4$ are dedicated to the data classified as video content, where compression algorithm $N_3$ is suitable for the high bit rate video content and compression algorithm $N_4$ is suitable for the low bit rate video content. Moreover, the compression algorithm $N_6$ is suitable for a text-rich image on web-browsing scenario. The compression algorithm $N_5$ is the default algorithm when none of above contents is detected. The classification of high bit rate content and low bit rate content may depend on the quantization parameter (QP) of a video bitstream such as an HEVC or H.264 encoded bitstream. When the QP is higher than a threshold, the input data is classified as low bit rate content; otherwise, it is high bit rate content. For example, when $QP_1$>THR, the compression algorithm $N_4$ is employed by the compression unit 204; and when $QP_2 \leq$THR, the compression algorithm $N_3$ is employed by the compression unit 204. Another embodiment is to calculate the data variance of the input data. When the variance is higher than a threshold, the input data is classified as high bit rate content; otherwise, it is low bit rate content.

Figure 5:
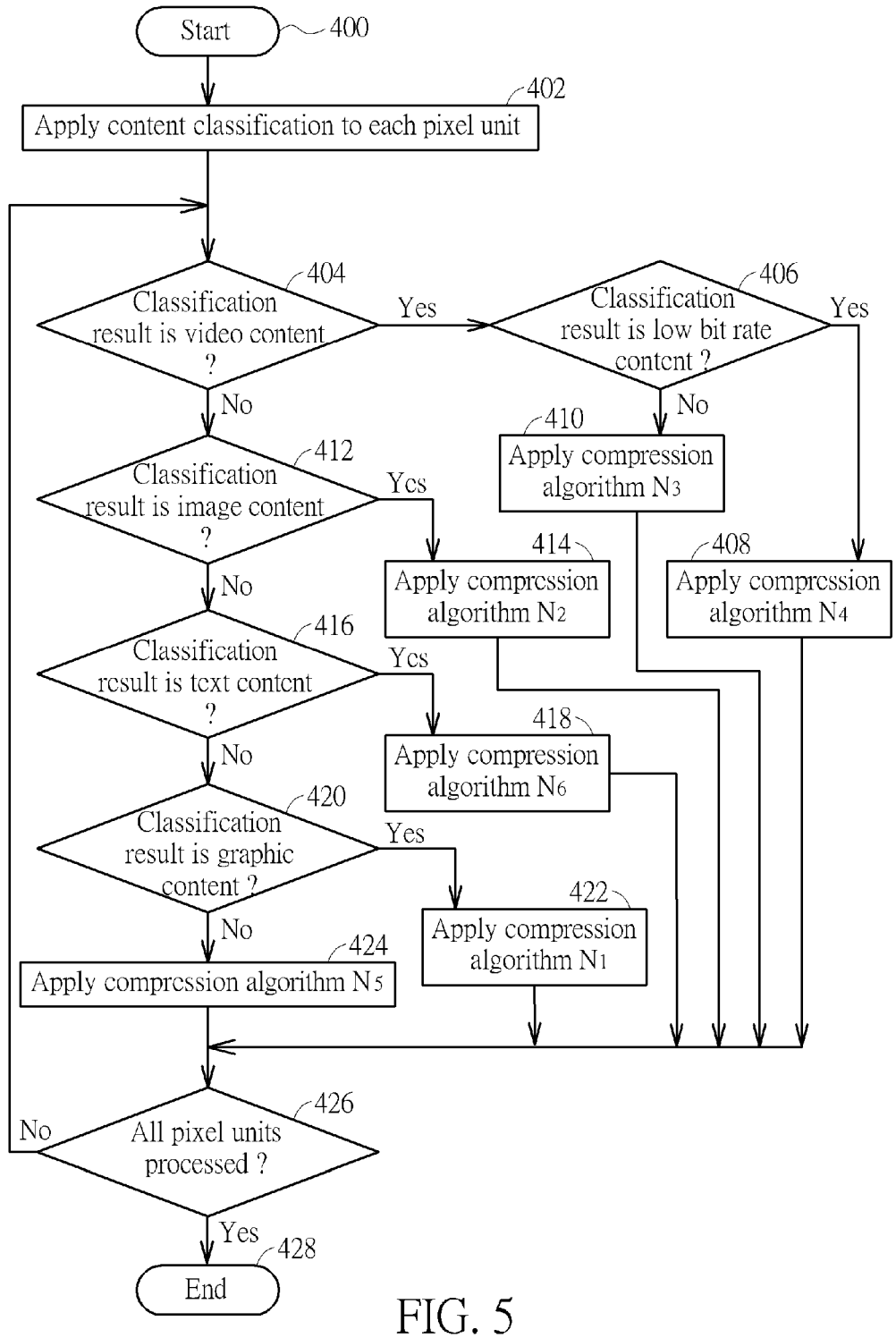
FIG. 5 is a flowchart illustrating an adaptive compression method based on context characteristics of the input display data according to an embodiment of the present invention.

FIG. 5 is a flowchart illustrating an adaptive compression method based on context characteristics of the input display data D1 according to an embodiment of the present invention. Provided that the result is substantially the same, the steps are not required to be executed in the exact order shown in FIG. 5. The exemplary adaptive compression method may be briefly summarized by following steps.

Step 400: Start.

Step 402: Apply a content classification to each received pixel unit included in the input display data D1, and accordingly generate the content classification result CR.

Step 404: Check if the content classification result CR indicates that the received pixel unit is a video content. If yes, go to step 406; otherwise, go to step 412.

Step 406: Check if the content classification result CR indicates that the received pixel unit is a low bit rate content (e.g., QP>THR). If yes, go to step 408; otherwise, go to step 410.

Step 408: Apply the compression algorithm $N_4$. Go to step 426.

Step 410: Apply the compression algorithm $N_3$. Go to step 426.

Step 412: Check if the content classification result CR indicates that the received pixel unit is an image content. If yes, go to step 414; otherwise, go to step 416.

Step 414: Apply the compression algorithm $N_2$. Go to step 426.

Step 416: Check if the content classification result CR indicates that the received pixel unit is a text content. If yes, go to step 418; otherwise, go to step 420.

Step 418: Apply the compression algorithm $N_6$. Go to step 426.

Step 420: Check if the content classification result CR indicates that the received pixel unit is a graphic content. If yes, go to step 422; otherwise, go to step 424.

Step 422: Apply the compression algorithm $N_1$. Go to step 426.

Step 424: Apply the compression algorithm $N_5$.

Step 426: Check if all of the received pixel units included in the input display data D1 have been processed. If yes, go to step 428; otherwise, go to step 404 to process the next received pixel unit.

Step 428: End.

It should be noted that step 402 is performed by the content analysis unit 202, and steps 404-426 are performed by the compression unit 204. As a person skilled in the art can readily understand details of each step shown in FIG. 5 after reading above paragraphs, further description is omitted here for brevity.

In a second exemplary embodiment, the compressor 128 may adaptively adjust a compression algorithm applied to the input display data D1 according to a power supply status.

Figure 6:
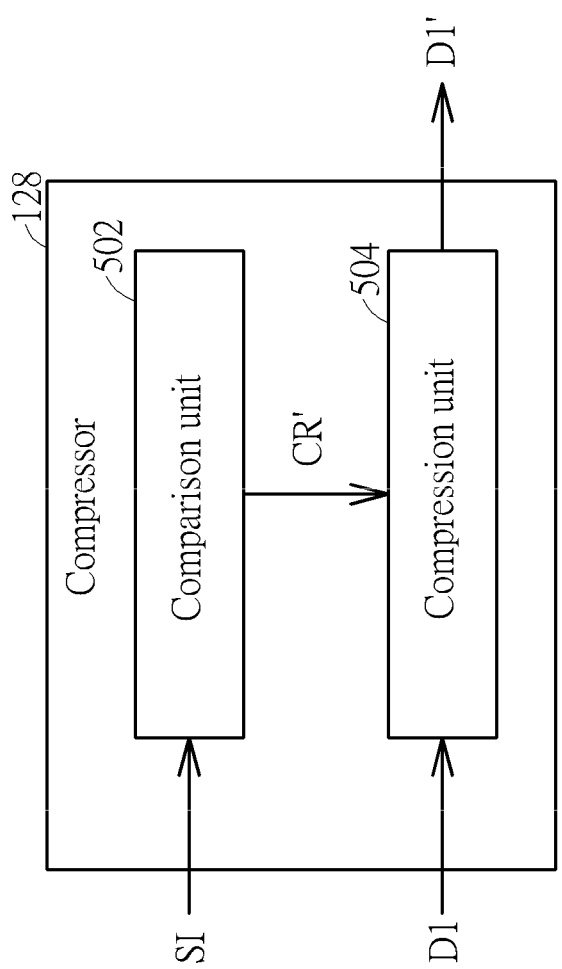
FIG. 6 is a diagram illustrating another embodiment of the compressor shown in FIG. 1.
Figure 7:
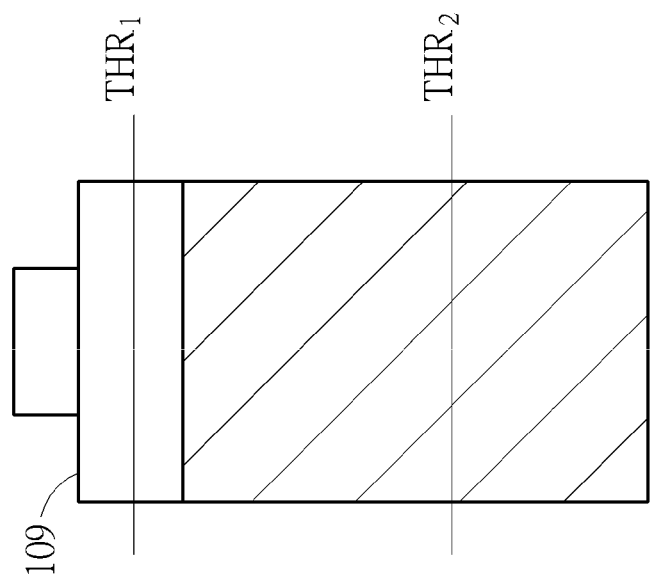
FIG. 7 is a diagram illustrating thresholds of the battery capacity of the battery device.

As shown in FIG. 1, the application processor 102 is powered by the battery device 109, and the side information given by the battery meter 130 would include the power supply status indicative of an available battery capacity of the battery device 109. Please refer to FIG. 6, which is a diagram illustrating another embodiment of the compressor 128 shown in FIG. 1. The compressor 128 includes a comparison unit 502 and a compression unit 504. The comparison unit 502 receives side information SI from the battery meter 130. The comparison unit 502 compares the available battery capacity of the battery device 109 as indicated by the side information SI with at least one predetermined threshold to generate a comparison result CR'. The compression unit 504 supports a plurality of compression algorithms having different characteristics, and refers to the comparison result CR' to select one of the supported compression algorithms for data compression. For example, as shown in FIG. 7, the comparison unit 502 employs a first predetermined threshold $THR_1$ and a second predetermined threshold $THR_2$, where $THR_1 > THR_2$. The first predetermined threshold $THR_1$ is checked to see if the data compression can be disabled to avoid information loss caused by a lossy compression algorithm. More specifically, the compressor 108 is arranged to disable the data compression when the power supply status indicates that the available battery capacity is higher than the first predetermined threshold $THR_1$, and enable the data compression when the power supply status indicates that the available battery capacity is not higher than the first predetermined threshold $THR_1$. To put it another way, when the battery power is full or higher than the first predetermined threshold $THR_1$, the compression algorithm is disabled to get better visual quality; and when the battery power is lower than the first predetermined threshold $THR_1$, a compression algorithm is enabled to save power dissipation of the display interface 103.

The second predetermined threshold $THR_2$ is checked to select one compression algorithm from supported compression algorithms having different characteristics. More specifically, the compressor 108 is arranged to employ the compression algorithm $N_1$ for compressing the input display data D1 when the power supply status indicates that the available battery capacity is higher than the second predetermined threshold $THR_2$, and employ the compression algorithm $N_2$ for compressing the input display data D1 when the power supply status indicates that the available battery capacity is not higher than the second predetermined threshold $THR_2$, where the compression algorithm $N_1$ is more complex than the compression algorithm $N_2$, and/or the compression algorithm $N_1$ has a higher compression efficiency than the compression algorithm $N_2$. To put it another way, when the battery power is almost full or higher than the second predetermined threshold $THR_2$, a more complex and higher compression efficiency algorithm can be selected by the compression unit 504 to get better visual quality; and when the battery power is almost empty or lower than the second predetermined threshold $THR_2$, a less complex and lower compression efficiency algorithm can be selected by the compression unit 504 to save power dissipation of the display interface 103.

Figure 8:
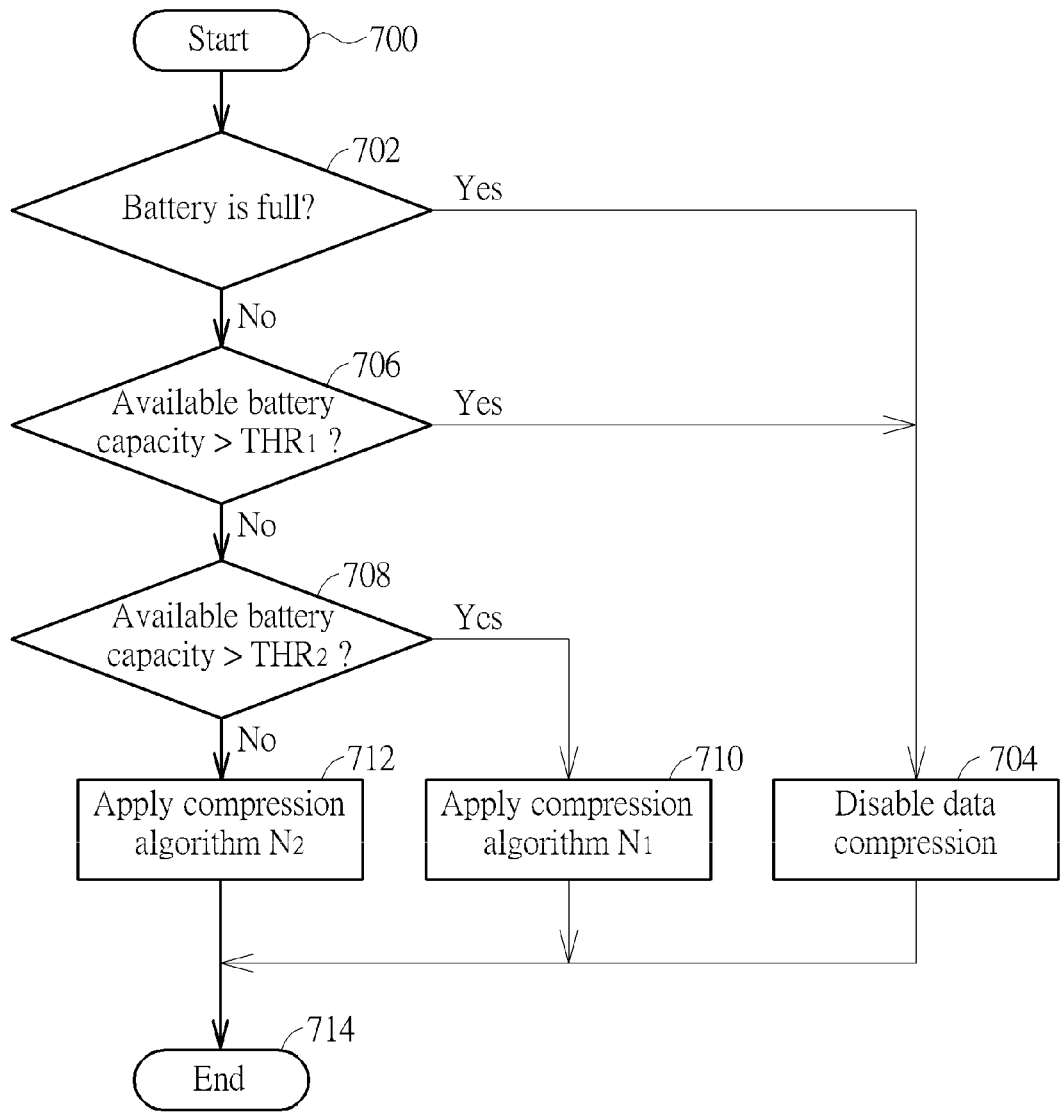
FIG. 8 is a flowchart illustrating an adaptive compression method based on a power supply status according to an embodiment of the present invention.

FIG. 8 is a flowchart illustrating an adaptive compression method based on a power supply status according to an embodiment of the present invention. Provided that the result is substantially the same, the steps are not required to be executed in the exact order shown in FIG. 8. The exemplary adaptive compression method may be briefly summarized by following steps.

Step 700: Start.
Step 702: Check if the battery is full. If yes, go to step 704; otherwise, go to step 706.
Step 704: Disable data compression.
Step 706: Check if the available battery capacity is higher than the first predetermined threshold $THR_1$. If yes, go to step 704; otherwise, go to step 708.
Step 708: Check if the available battery capacity is higher than the second predetermined threshold $THR_2$. If yes, go to step 710; otherwise, go to step 712.
Step 710: Apply the compression algorithm $N_1$. Go to step 714.
Step 712: Apply the compression algorithm $N_2$.
Step 714: End.

It should be noted that steps 702, 706, 708 are performed by the comparison unit 502, and steps 704, 710, 712 are performed by the compression unit 504. As a person skilled in the art can readily understand details of each step shown in FIG. 8 after reading above paragraphs, further description is omitted here for brevity.

Figure 9:
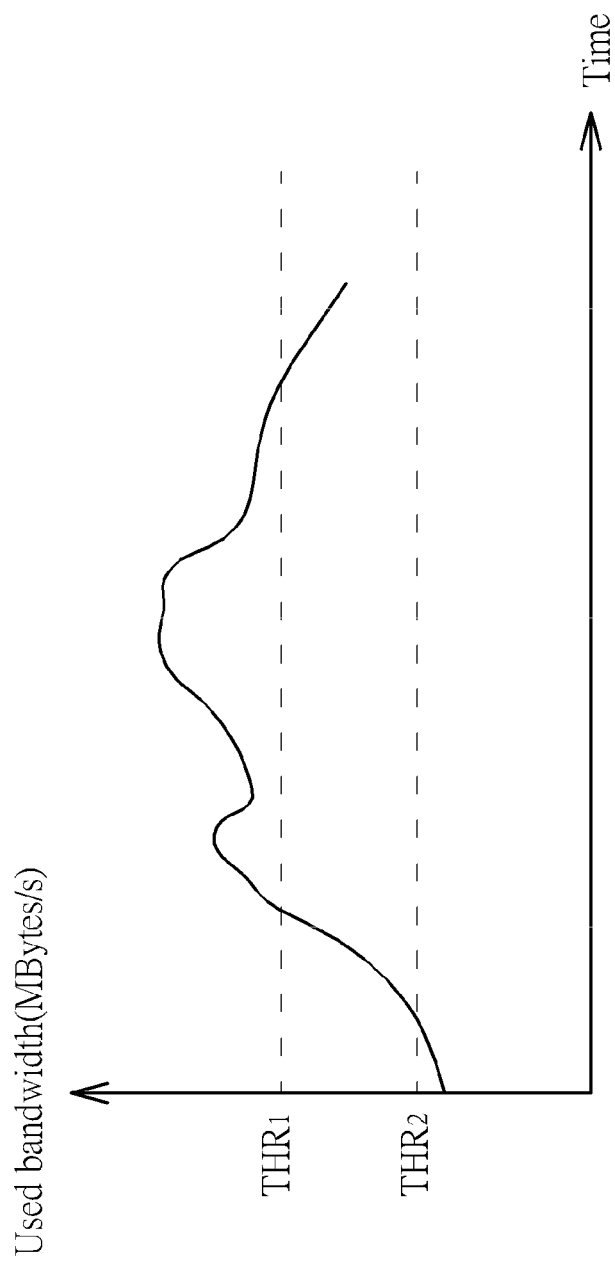
FIG. 9 is a diagram illustrating thresholds of the bandwidth of the storage device.

In a third exemplary embodiment, the compressor 128 may adaptively adjust a compression algorithm applied to the input display data D1 according to an operational status of a storage device such as the external storage 108. The side information SI given by the external storage 108 would include the operational status indicative of a used bandwidth of the external storage 108. Please refer to FIG. 6 again. In this embodiment, the comparison unit 502 receives the side information SI from the external storage 108. Next, the comparison unit 502 compares the used bandwidth of the external storage 108 as indicated by the side information SI with at least one predetermined threshold to generate the comparison result CR'. The compression unit 504 supports a plurality of compression algorithms having different characteristics, and refers to the comparison result CR' to select one of the supported compression algorithms for data compression. For example, as shown in FIG. 9, the comparison unit 502 employs a first predetermined threshold $THR_1$ and a second predetermined threshold $THR_2$, where $THR_1 > THR_2$. The second predetermined threshold $THR_2$ is checked to see if the data compression can be disabled to avoid information loss caused by a lossy compression algorithm. More specifically, the compressor 108 is arranged to disable the data compression when the side information SI indicates that the used bandwidth is lower than the second predetermined threshold $THR_2$, and enable the data compression when the side information SI indicates that the used bandwidth is not lower than the second predetermined threshold $THR_2$.

The first predetermined threshold $THR_1$ is checked to select one compression algorithm from candidate compression algorithms having different characteristics. More specifically, the compressor 108 is arranged to employ the compression algorithm $N_1$ for compressing the input display data D1 when the side information SI indicates that the used bandwidth is lower than the first predetermined threshold $THR_1$, and employ the compression algorithm $N_2$ for compressing the input display data D1 when the side information SI indicates that the used bandwidth is not lower than the first predetermined threshold $THR_1$, where the compression algorithm $N_1$ is more complex than the compression algorithm $N_2$, and/or the compression algorithm $N_1$ has a higher compression efficiency than the compression algorithm $N_2$. To put it another way, when the used bandwidth is lower than the first predetermined threshold $THR_1$, a more complex and higher compression efficiency algorithm can be selected by the compression unit 504 to get better visual quality; and when the bandwidth is almost used or the used bandwidth is not lower than the first predetermined threshold $THR_1$, a less complex and lower compression efficiency algorithm can be selected by the compression unit 504 to save power dissipation of the display interface 103.

Figure 10:
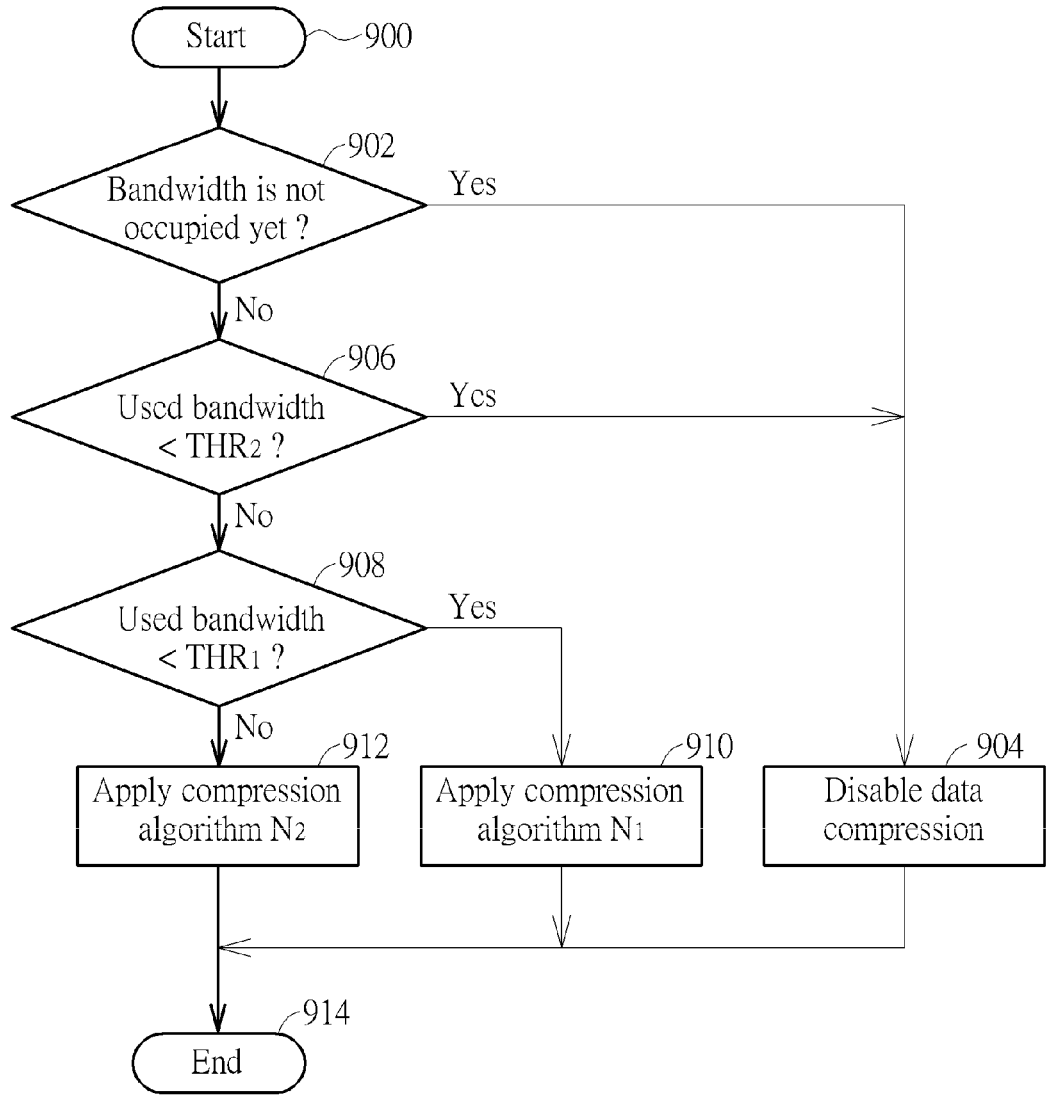
FIG. 10 is a flowchart illustrating an adaptive compression method based on an operating status of a storage device according to an embodiment of the present invention.

FIG. 10 is a flowchart illustrating an adaptive compression method based on an operating status of a storage device according to an embodiment of the present invention. Provided that the result is substantially the same, the steps are not required to be executed in the exact order shown in FIG. 10. The exemplary adaptive compression method may be briefly summarized by following steps.

Step 900: Start.

Step 902: Check if the bandwidth is not occupied yet. If yes, go to step 904; otherwise, go to step 906.

Step 904: Disable data compression. Go to step 914.

Step 906: Check if the used bandwidth is lower than the second predetermined threshold $THR_2$. If yes, go to step 904; otherwise, go to step 908.

Step 908: Check if the used bandwidth is lower than the first predetermined threshold $THR_1$. If yes, go to step 910; otherwise, go to step 912.

Step 910: Apply the compression algorithm $N_1$. Go to step 914.

Step 912: Apply the compression algorithm $N_2$.

Step 914: End.

It should be noted that steps 902, 906, 908 are performed by the comparison unit 502, and steps 904, 910, 912 are performed by the compression unit 504. As a person skilled in the art can readily understand details of each step shown in FIG. 10 after reading above paragraphs, further description is omitted here for brevity.

In a fourth exemplary embodiment, the compressor 128 may adaptively adjust a compression algorithm applied to the input display data D1 according to at least one image capture characteristic. The side information SI given by the ISP 114 may include at least one of a focus level, an exposure level, and an ISO (International Organization for Standardization) value. Please refer to FIG. 6 again. In this embodiment, the comparison unit 502 receives the side information SI from the ISP 114, and compares the side information SI with at least one predetermined threshold to generate the comparison result CR'. The compression unit 504 supports a plurality of compression algorithms having different characteristics, and refers to the comparison result CR' to select one of the supported compression algorithms to achieve better compression performance or visual quality. For example, a blurred image is captured when the focus level is lower than a first predetermined threshold $THR_1$. Hence, the compression algorithm $N_4$ particularly designed for compressing the blurred image is selected by the comparison unit 502. An over-exposure or under-exposure image is obtained when the exposure level is out of a specific range delimited by a second predetermined threshold $THR_2$ and a third predetermined threshold $THR_3$, where $THR_2 > THR_3$. Hence, the compression algorithm $N_3$ particularly designed to manipulate this kind of captured image is selected by the compression unit 502. Alternatively, the over-exposure image and the under-exposure image may be processed by different compression algorithms. In addition, the ISO value from the ISP 114 can be exploited as side information since it impacts the noise level on the captured image. Specifically, the ISO value is positively correlated to the noise level. Hence, if the ISO value is not lower than a fourth predetermined threshold $THR_4$, a high ISO image can be compressed using the compression algorithm $N_1$ such that noise pixels can be properly considered during the compression. If the ISO value is lower than the fourth predetermined threshold $THR_4$, the compression algorithm $N_2$ is selected by the compression unit 504 to achieve better compression performance for the low ISO image.

Figure 11:
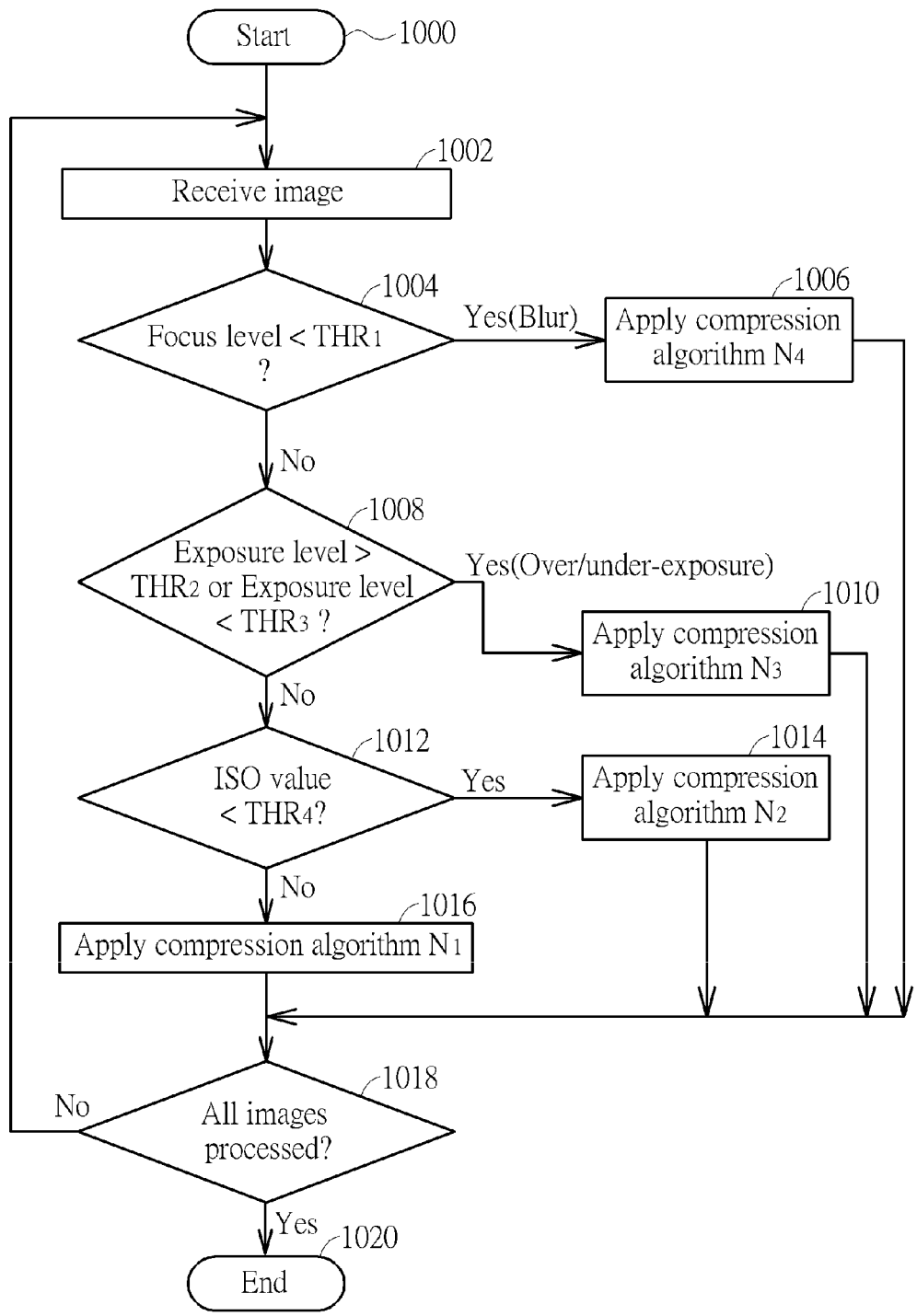
FIG. 11 is a flowchart illustrating an adaptive compression method based on at least one image capture characteristic according to an embodiment of the present invention.

FIG. 11 is a flowchart illustrating an adaptive compression method based on at least one image capture characteristic according to an embodiment of the present invention. Provided that the result is substantially the same, the steps are not required to be executed in the exact order shown in FIG. 11. The exemplary adaptive compression method may be briefly summarized by following steps.

Step 1000: Start.

Step 1002: Receive an image.

Step 1004: Check if the focus level of the image is lower than the first predetermined threshold $THR_1$. If yes, go to step 1006; otherwise, go to step 1008.

Step 1006: Apply the compression algorithm $N_4$. Go to step 1018.

Step 1008: Check if the exposure level of the image is higher than the second predetermined threshold $THR_2$ or lower than the third predetermined threshold $THR_3$. If yes, go to step 1010; otherwise, go to step 1012.

Step 1010: Apply the compression algorithm $N_3$. Go to step 1018.

Step 1012: Check if the ISO value of the image is lower than the fourth predetermined threshold $THR_4$. If yes, go to step 1014; otherwise, go to step 1016.

Step 1014: Apply the compression algorithm $N_2$. Go to step 1018.

Step 1016: Apply the compression algorithm $N_1$.

Step 1018: Check if all of the images have been processed. If yes, go to step 1020; otherwise, go to step 1002 to process the next image.

Step 1020: End.

It should be noted that steps 1004, 1008, 1012 are performed by the comparison unit 502, and steps 1002, 1006, 1010, 1014, 1016, 1018 are performed by the compression unit 504. As a person skilled in the art can readily understand details of each step shown in FIG. 11 after reading above paragraphs, further description is omitted here for brevity.

Figure 12:
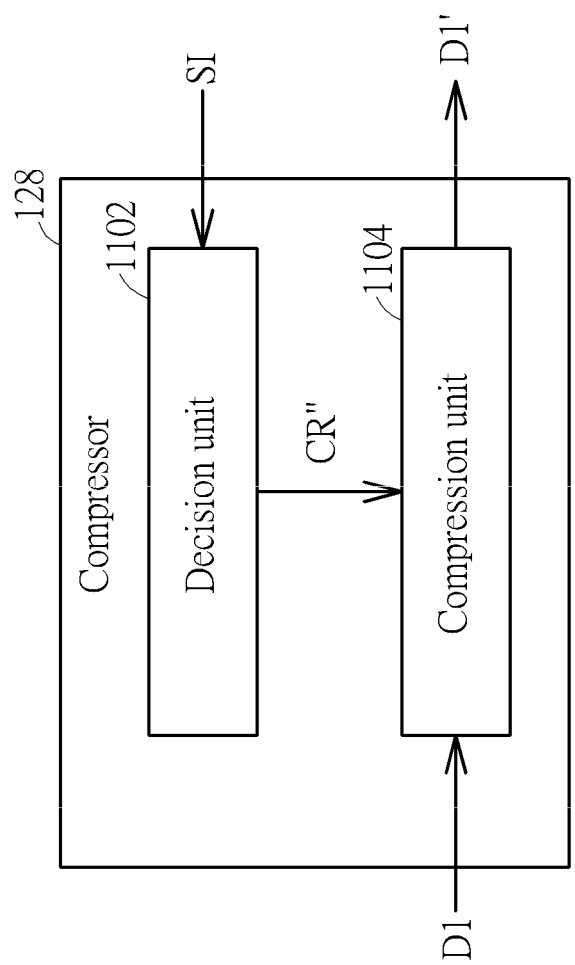
FIG. 12 is a diagram illustrating yet another embodiment of the compressor shown in FIG. 1.

In a fifth exemplary embodiment, the compressor 128 may adaptively adjust a compression algorithm applied to the input display data D1 according to a configuration of the driver IC 104. The side information SI given by the driver IC 104 may indicate whether the driver IC 104 is buffer-less or buffer-based, and/or indicate whether an image/command mode or a video mode is employed by a buffer-based driver IC. Please refer to FIG. 12, which is a diagram illustrating yet another embodiment of the compressor 128 shown in FIG. 1. The compressor 128 includes a decision unit 1102 and a compression unit 1104. The decision unit 1102 receives side information SI from the driver IC 104, and checks the side information SI to know the configuration of the driver IC 104 and accordingly generates a checking result CR". Driver ICs may be categorized into buffer-based driver ICs and buffer-less driver ICs. When the driver IC 104 belongs to a buffer-less category, no line buffers can be used during the de-compression procedure. Thus, the compression algorithm $N_3$, which performs data compression upon a current pixel unit without referring to adjacent pixel units above the current pixel unit, is preferably selected by the compression unit 1104.

When the driver IC 104 belongs to a buffer-based category, the driver IC 104 is equipped with a display buffer which may be allocated in a shared buffer resource or implemented using a dedicated buffer resource. The buffer-based driver IC 104 may be controlled to operate in either an image/command mode or a video mode. When the image/command mode of the buffer-based driver IC 104 is enabled, the display buffer is used to buffer the display data, thus allowing partial update of the buffered display data. Hence, to benefit from the partial update feature in the image/command mode, the compression algorithm $N_2$ with a smaller unit size of compression is preferably selected by the compression unit 1104 such that the compressed data generated from the smaller unit size of compression can be independently and randomly accessed and then de-compressed. When the video mode of the buffer-based driver IC 104 is enabled, the display buffer is not used to buffer the display data. As no partial update feature is supported in the video mode, the compression unit 1104 preferably selects the compression algorithm $N_1$ with a larger unit size of compression. By way of example, a frame-based compression is achieved through using the compression algorithm $N_1$. To put it simply, the compressor 128 is arranged to employ the compression algorithm $N_1$ for compressing the input display data D1 when the checking result CR" indicates that the driver IC 104 is configured to directly transmit a de-compressed pixel data to a display apparatus (i.e., display panel 106) without data buffering (i.e., the driver IC 104 employs the video mode for display data transmission), and employ the compression algorithm $N_2$ for compressing the input display data D1 when the checking result CR" indicates that the driver IC 104 is configured to transmit the de-compressed pixel data to the display apparatus (i.e., display panel 106) through data buffering (i.e., the driver IC 104 employs the image/command mode for display data transmission).

Figure 13:
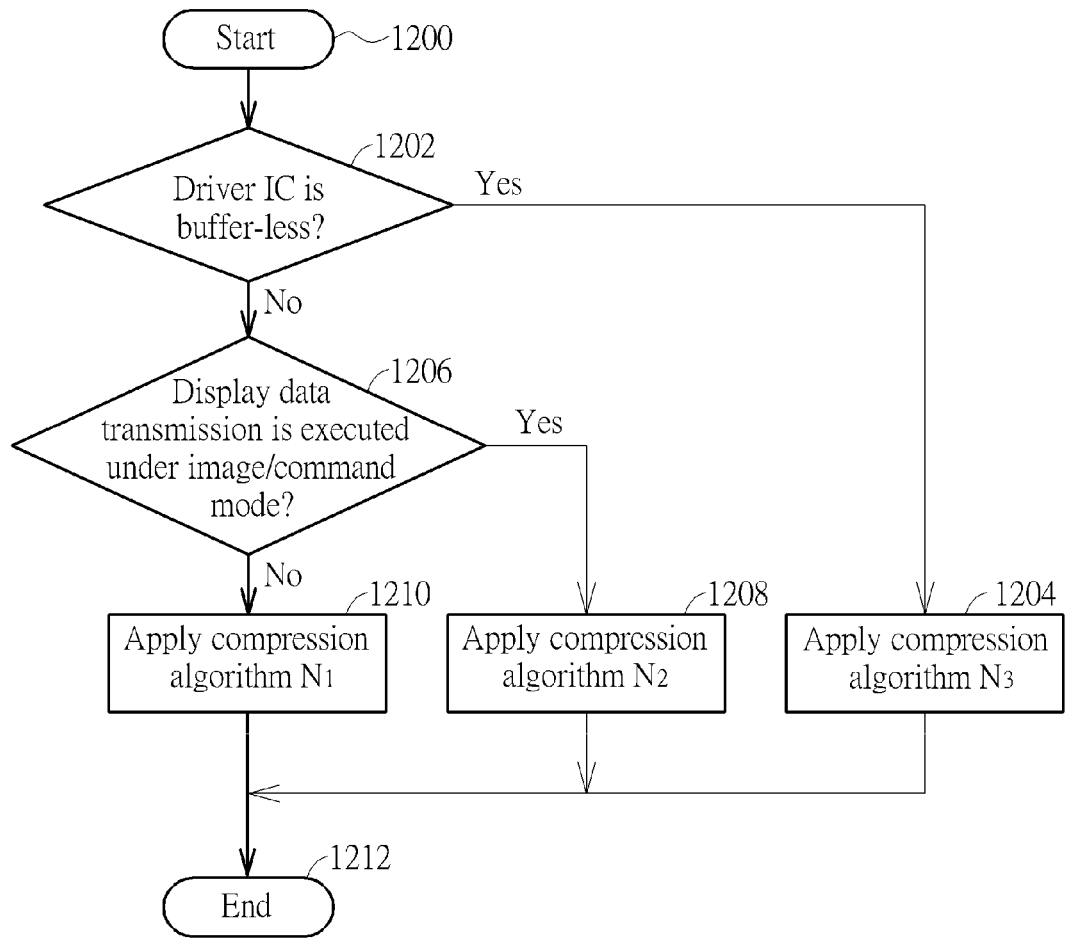
FIG. 13 is a flowchart illustrating an adaptive compression method based on a configuration of the driver IC according to an embodiment of the present invention.

FIG. 13 is a flowchart illustrating an adaptive compression method based on a configuration of the driver IC 104 according to an embodiment of the present invention. Provided that the result is substantially the same, the steps are not required to be executed in the exact order shown in FIG. 13. The exemplary adaptive compression method may be briefly summarized by following steps.

Step 1200: Start.

Step 1202: Check the side information SI given by the driver IC 104 to determine if the driver IC is buffer-less. If yes, go to step 1204; otherwise, go to step 1206.

Step 1204: Apply the compression algorithm $N_3$. Go to step 1212.

Step 1206: Check the side information SI given by the driver IC 104 to determine if display data transmission is executed under the image/command mode. If yes, go to step 1208; otherwise, go to step 1210.

Step 1208: Apply the compression algorithm $N_2$. Go to step 1212.

Step 1210: Apply the compression algorithm $N_1$.

Step 1212: End.

It should be noted that steps 1202 and 1206 are performed by the decision unit 1102, and steps 1204, 1208, 1210 are performed by the compression unit 1104. As a person skilled in the art can readily understand details of each step shown in FIG. 13 after reading above paragraphs, further description is omitted here for brevity.

Figure 14:
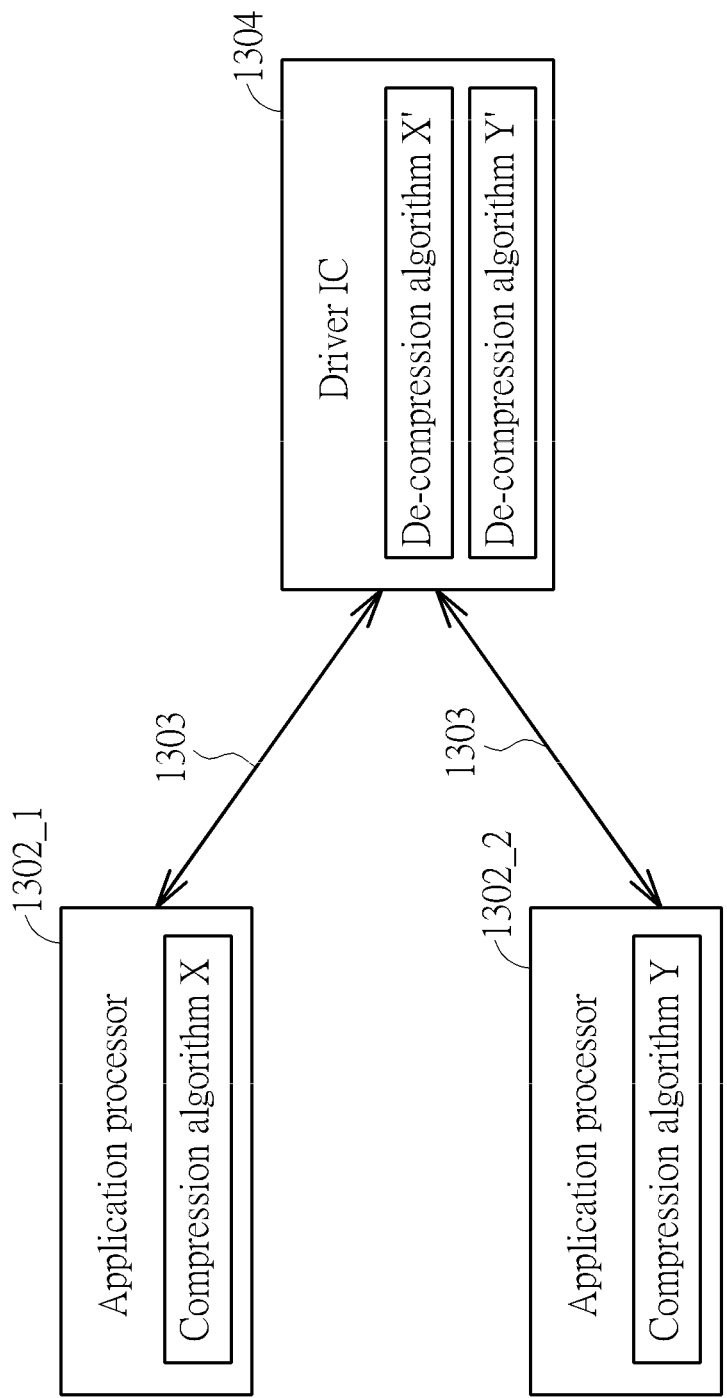
FIG. 14 is a diagram illustrating configuration of a compressor in an application processor and configuration of a de-compressor in a driver IC according to an embodiment of the present invention.

In a sixth exemplary embodiment, the compressor 128 may adaptively adjust a compression algorithm applied to the input display data D1 according to a de-compression algorithm supported by the driver IC 104, and the de-compressor 144 may adaptively adjust a de-compression algorithm applied to the input display data D2 according to a compression algorithm supported by the application processor 102. Please refer to FIG. 14, which is a diagram illustrating a configuration of a compressor in an application processor and a configuration of a de-compressor in a driver IC according to an embodiment of the present invention. Each of the application processors 1302_1 and 1302_2 supports a plurality of compression algorithms, and the driver IC 1304 supports a plurality of de-compression algorithms. When the driver IC 1304 (e.g., driver IC 104 shown in FIG. 1) is used to connect the application processor 1302_1 (e.g., application processor 102 shown in FIG. 1) via a display interface 1303 (e.g., display interface 103 shown in FIG. 1), the driver IC 1304 sends side information to inform the application processor 1302_1 of the supported de-compression algorithms X' and Y'. As the compression algorithm X supported by the application processor 1302_1 is compliant with the de-compression algorithm X', the application processor 1302_1 therefore selects and enables the compression algorithm X of the compressor (e.g., compressor 128 shown in FIG. 1). In addition, the application processor 1302_1 sends side information to inform the driver IC 1304 of the employed compression algorithm X. As the de-compression algorithm X' supported by the driver IC 1304 is compliant with the compression algorithm X, the driver IC 1304 therefore selects and enables the de-compression algorithm X' of the de-compressor (e.g., de-compressor 144 shown in FIG. 1).

The driver IC 1304 may be used in a variety of applications, and therefore supports different de-compression algorithms. Thus, in one exemplary application, the driver IC 1304 is used to connect the application processor 1302_1. However, in another application, the driver IC 1304 is used to connect the application processor 1302_2. When the driver IC 1304 is used to connect the application processor 1302_2 via the display interface 1303, the driver IC 1304 sends side information to inform the application processor 1302_2 of the supported de-compression algorithms X' and Y'. As the compression algorithm Y supported by the application processor 1302_2 is compliant with the de-compression algorithm Y', the application processor 1302_2 therefore selects and enables the compression algorithm Y of the compressor. In addition, the application processor 1302_2 sends side information to inform the driver IC 1304 of the employed compression algorithm Y. As the de-compression algorithm Y' supported by the driver IC 1304 is compliant with the compression algorithm Y, the driver IC 1304 therefore selects and enables the de-compression algorithm Y' of the de-compressor.

Figure 15:
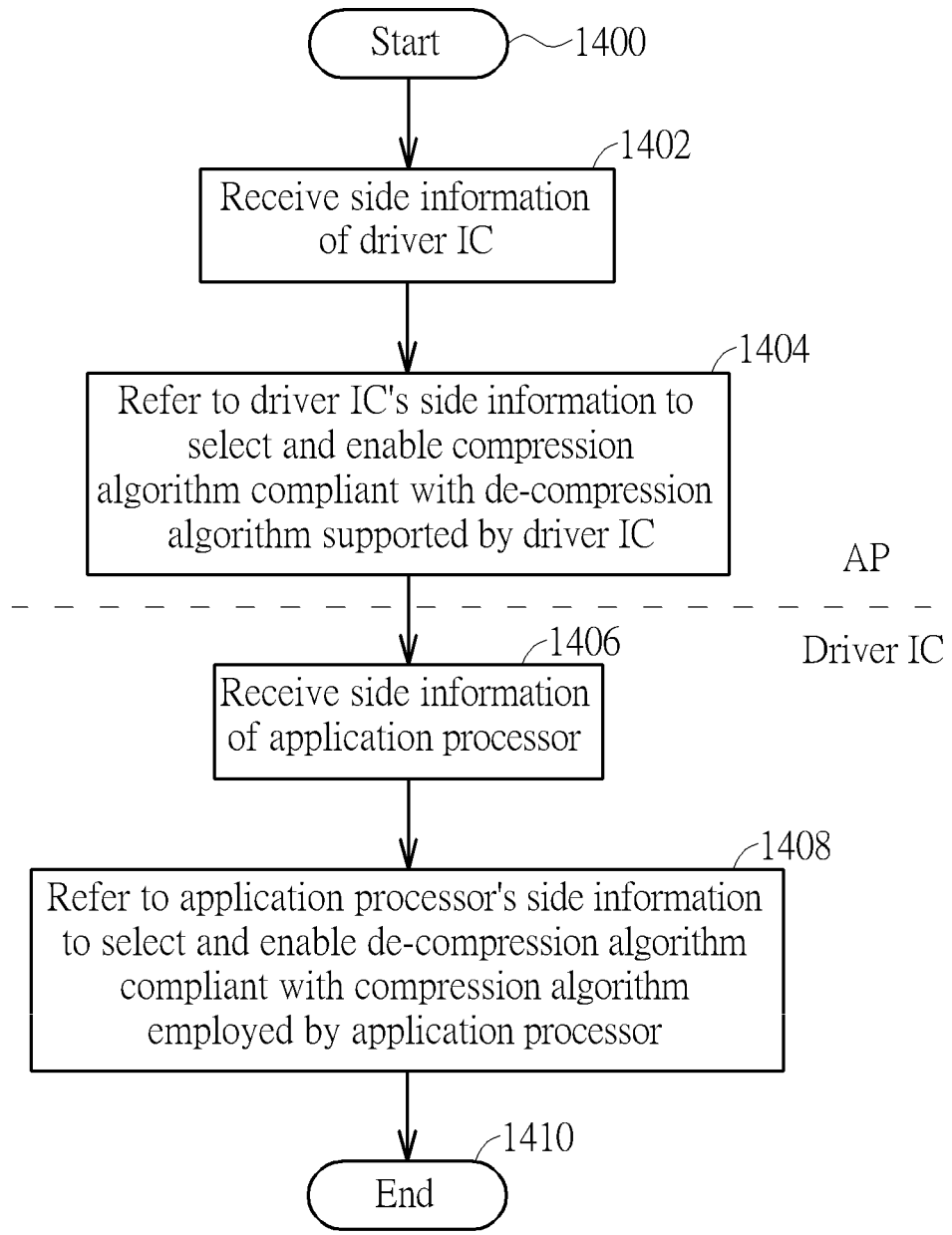
FIG. 15 is a flowchart illustrating an adaptive compression and de-compression method based on side information communicated between an application processor and a driver IC according to an embodiment of the present invention.

FIG. 15 is a flowchart illustrating an adaptive compression and de-compression method based on side information communicated between an application processor and a driver IC according to an embodiment of the present invention. Provided that the result is substantially the same, the steps are not required to be executed in the exact order shown in FIG. 15. The exemplary adaptive compression and de-compression method may be briefly summarized by following steps.

Step 1400: Start.

Step 1402: Receive side information of the driver IC.

Step 1404: Refer to the driver IC's side information to select and enable a compression algorithm compliant with a de-compression algorithm supported by the driver IC.

Step 1406: Receive side information of the application processor.

Step 1408: Refer to the application processor's side information to select and enable a de-compression algorithm compliant with a compression algorithm employed by the application processor.

Step 1410: End.

It should be noted that steps 1402 and 1404 are performed by the application processor (AP), and steps 1406 and 1408 are performed by the driver IC. As a person skilled in the art can readily understand details of each step shown in FIG. 15 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing apparatus comprising:
   a compressor circuit, arranged for receiving an input display data and generating an output display data according to the input display data; and
   an output interface circuit, arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compressor circuit is transmitted over the display interface;
   wherein the compressor circuit adaptively adjusts a compression algorithm applied to the input display data according to context characteristics of the input display data,
   wherein the content characteristics include at least one bit rate,
   wherein at least one of a complexity and a compression efficiency of the compression algorithm scales proportionally to the at least one bit rate, and
   wherein the display interface is not a network interface, and the display interface is coupled between the data processing apparatus and another data processing apparatus that are located on different chips.

2. The data processing apparatus of claim 1, wherein the compressor circuit comprises:
   a content analysis unit, arranged for analyzing the input display data to classify contents included in the input display data and accordingly generating a content classification result; and
   a compression unit, arranged for referring to at least the content classification result to adaptively adjust the compression algorithm.

3. The data processing apparatus of claim 2, wherein the contents are selected from a group consisting of a video content, an image content, a text content, and a graphic content.

4. The data processing apparatus of claim 2, wherein the contents comprise a first content generated using a first quantization level and a second content generated using a second quantization level which is different from the first quantization level.

5. The data processing apparatus of claim 2, wherein the contents comprise a first content with a first bit rate and a second content with a second bit rate which is different from the first bit rate.

6. A data processing apparatus comprising:
   a compressor circuit, arranged for receiving an input display data and generating an output display data according to the input display data; and
   an output interface circuit, arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compressor circuit is transmitted over the display interface;
   wherein the compressor circuit adaptively adjusts a compression algorithm applied to the input display data according to a power supply status,
   wherein the power supply status indicates a battery power level,
   wherein at least one of a complexity and a compression efficiency of the compression algorithm scales proportionally to the battery power level, and
   wherein the display interface is not a network interface, and the display interface is coupled between the data processing apparatus and another data processing apparatus that are located on different chips.

7. The data processing apparatus of claim 6, wherein the data processing apparatus is powered by a battery device, and the power supply status indicates the battery power level of the battery device.

8. The data processing apparatus of claim 7, wherein the compressor circuit is arranged to employ a first compression algorithm as the compression algorithm when the power supply status indicates that the battery power level is higher than a predetermined threshold, and employ a second compression algorithm as the compression algorithm when the power supply status indicates that the battery power level is not higher than the predetermined threshold, where the second compression algorithm is different from the first compression algorithm.

9. The data processing apparatus of claim 8, wherein the first compression algorithm is more complex than the second compression algorithm; or the first compression algorithm has a higher compression efficiency than the second compression algorithm.

10. The data processing apparatus of claim 7, wherein the compressor circuit is arranged to disable the compression algorithm when the power supply status indicates that the battery power level is higher than a predetermined threshold, and enable the compression algorithm when the power supply status indicates that the battery power level is not higher than the predetermined threshold.

11. A data processing apparatus comprising:
    a compressor circuit, arranged for receiving an input display data and generating an output display data according to the input display data; and
    an output interface circuit, arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compressor circuit is transmitted over the display interface;
    wherein the compressor circuit adaptively adjusts a compression algorithm applied to the input display data according to an operational status of a storage device,
    wherein the operational status indicates a storage space use level of the storage device, wherein at least one of a complexity and a compression efficiency of the compression algorithm scales inversely to the storage space use level, and wherein the display interface is not a network interface, and the display interface is coupled between the data processing apparatus and another data processing apparatus that are located on different chips.

12. The data processing apparatus of claim 11, wherein the compressor circuit is arranged to employ a first compression algorithm as the compression algorithm when the operational status indicates that the storage space use level is lower than a predetermined threshold, and employ a second compression algorithm as the compression algorithm when the operational status indicates that the storage space use level is not lower than the predetermined threshold, where the second compression algorithm is different from the first compression algorithm.

13. The data processing apparatus of claim 12, wherein the first compression algorithm is more complex than the second compression algorithm; or the first compression algorithm has a higher compression efficiency than the second compression algorithm.

14. The data processing apparatus of claim 11, wherein the compressor circuit is arranged to disable the compression algorithm when the operational status indicates that the storage space use level used bandwidth is lower than a predetermined threshold, and enable the compression algorithm when the operational status indicates that the storage space use level used bandwidth is not lower than the predetermined threshold.

15. A data processing apparatus comprising:

a compressor circuit, arranged for receiving an input display data and generating an output display data according to the input display data; and an output interface circuit, arranged for packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compressor circuit is transmitted over the display interface;

wherein the compressor circuit adaptively adjusts a compression algorithm applied to the input display data according to at least one image capture characteristic, wherein the at least one image capture characteristic is selected from a set of image capture characteristics including a focus level, an exposure level, and an ISO (International Organization for Standardization) value, wherein at least one of a complexity and a compression efficiency of the compression algorithm differs for each one of the image capture characteristics, and wherein the display interface is not a network interface, and the display interface is coupled between the data processing apparatus and another data processing apparatus that are located on different chips.

16. The data processing apparatus of claim 15, wherein the compressor circuit supports a plurality of pre-defined compression algorithms; when the compressor circuit determines that the at least one image capture characteristic has a first value, the compression algorithm is set by a first pre-defined compression algorithm selected from the pre-defined compression algorithms; and when the compressor circuit determines that the at least one image capture characteristic has a second value, the compression algorithm is set by a second pre-defined compression algorithm selected from the pre-defined compression algorithms.

17. A data processing apparatus comprising:

a compressor circuit, arranged for receiving an input display data and generating an output display data according to the input display data; and an output interface circuit, arranged for packing the output display data into an output bitstream, and outputting the output bitstream to another data processing apparatus via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compressor circuit is transmitted over the display interface;

wherein the compressor circuit adaptively adjusts a compression algorithm applied to the input display data according to a configuration of the another data processing apparatus, wherein the configuration of the another data processing apparatus is selected from a set of configurations including a buffer-less configuration, a buffer-based configuration without data buffering, and a buffer-based configuration with data buffering, wherein at least one of a complexity and a compression efficiency of the compression algorithm differs for each one of the configurations, and wherein the display interface is not a network interface, and the display interface is coupled between the data processing apparatus and another data processing apparatus that are located on different chips.

18. The data processing apparatus of claim 17, wherein the compressor circuit is arranged to employ a first compression algorithm as the compression algorithm when the another data processing apparatus includes the buffer-based configuration, and employ a second compression algorithm as the compression algorithm when the another data processing apparatus includes the buffer-less configuration, where the second compression algorithm is different from the first compression algorithm.

19. The data processing apparatus of claim 17, wherein the compressor circuit is arranged to employ a first compression algorithm as the compression algorithm when the another data processing apparatus is configured to directly transmit a de-compressed pixel data to a display apparatus without data buffering, and employ a second compression algorithm as the compression algorithm when the another data processing apparatus is configured to transmit the de-compressed pixel data to the display apparatus through data buffering, where the second compression algorithm is different from the first compression algorithm.

20. The data processing apparatus of claim 19, wherein a unit size of compression of the first compression algorithm is larger than a unit size of compression of the second compression algorithm.

21. A data processing apparatus comprising:

a compressor circuit, arranged for receiving an input display data and generating an output display data according to the input display data; and an output interface circuit, arranged for packing the output display data into an output bitstream, and outputting the output bitstream to another data processing apparatus via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compressor circuit is transmitted over the display interface;

wherein the compressor circuit adaptively adjusts a compression algorithm applied to the input display data according to a de-compression algorithm supported by the another data processing apparatus, wherein at least one of a first complexity and a first compression efficiency of the compression algorithm is compliant with at least one corresponding characteristic of the de-compression algorithm, and wherein the display interface is not a network interface, and the display interface is coupled between the data processing apparatus and the another data processing apparatus that are located on different chips.

22. A data processing apparatus comprising:

an input interface circuit, arranged for receiving an input bitstream from another data processing apparatus via a display interface, and un-packing the input bitstream into an input display data, wherein the display interface is a display serial interface (DSI) standardized by a Mobile Industry Processor Interface (MIPI) or an embedded display port (eDP) standardized by a Video Electronics Standards Association (VESA); and a de-compressor circuit, arranged for generating a de-compressed display data according to the input display data when the input display data is a compressed display data;

wherein the de-compressor circuit adaptively adjusts a de-compression algorithm according to a compression algorithm employed by the another data processing apparatus; and compressed display data to be decompressed by the de-compressor is transmitted over the display interface and received from the display interface, wherein at least one characteristic of the de-compression algorithm is compliant with a corresponding one of a first complexity and a first compression efficiency of the compression algorithm, and wherein the display interface is not a network interface, and the display interface is coupled between the data processing apparatus and the another data processing apparatus that are located on different chips.

23. A data processing method comprising:

receiving an input display data;

adaptively adjusting a compression algorithm according to context characteristics of the input display data;

generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compression algorithm is transmitted over the display interface, wherein the content characteristics include at least one bit rate, wherein at least one of a complexity and a compression efficiency of the compression algorithm scales proportionally to the at least one bit rate, and wherein the display interface is not a network interface, and the display interface is coupled between a data processing apparatus implementing the data processing method and another data processing apparatus that are located on different chips.

24. A data processing method comprising:

receiving an input display data;

adaptively adjusting a compression algorithm according to a power supply status;

generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIDI) or an embedded display port (eDP) standardized by a Video Electronics Standards Association (VESA) and compressed display data generated by the compression algorithm is transmitted over the display interface, wherein the power supply status indicates a battery power level, wherein at least one of a complexity and a compression efficiency of the compression algorithm scales proportionally to the battery power level, and wherein the display interface is not a network interface, and the display interface is coupled between a data processing apparatus implementing the data processing method and another data processing apparatus that are located on different chips.

25. A data processing method comprising:

receiving an input display data;

adaptively adjusting a compression algorithm according to an operational status of a storage device;

generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compression algorithm is transmitted over the display interface, wherein the operational status indicates a storage space use level of the storage device, wherein at least one of a complexity and a compression efficiency of the compression algorithm scales inversely to the storage space use level, and wherein the display interface is not a network interface, and the display interface is coupled between a data processing apparatus implementing the data processing method and another data processing apparatus that are located on different chips.

26. A data processing method comprising:

receiving an input display data;

adaptively adjusting a compression algorithm according to at least one image capture characteristic;

generating an output display data according to the compression algorithm and the input display data; and packing the output display data into an output bitstream, and outputting the output bitstream via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compression algorithm is transmitted over the display interface, wherein the at least one image capture characteristic is selected from a set of image capture characteristics including a focus level, an exposure level, and an ISO (International Organization for Standardization) value, wherein at least one of a complexity and a compression efficiency of the compression algorithm differs for each one of the image capture characteristics, and wherein the display interface is not a network interface, and the display interface is coupled between a data processing apparatus implementing the data processing method and another data processing apparatus that are located on different chips.

27. A data processing method comprising:

receiving an input display data;

adaptively adjusting a compression algorithm according to a configuration of another data processing apparatus;

generating an output display data according to the compression algorithm and the input display data; and packing the output display data into an output bitstream, and outputting the output bitstream to the another data processing apparatus via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compression algorithm is transmitted over the display interface, wherein the configuration of the another data processing apparatus is selected from a set of configurations including a buffer-less configuration, a buffer-based configuration without data buffering, and a buffer-based configuration with data buffering, wherein at least one of a complexity and a compression efficiency of the compression algorithm differs for each one of the configurations, and wherein the display interface is not a network interface, and the display interface is coupled between a data processing apparatus implementing the data processing method and the another data processing apparatus that are located on different chips.

28. A data processing method comprising:

receiving an input display data;

adaptively adjusting a compression algorithm according to a de-compression algorithm supported by another data processing apparatus;

generating an output display data according to the compression algorithm and the input display data; and packing the output display data into an output bitstream, and outputting the output bitstream to the another data processing apparatus via a display interface, wherein the display interface is a display serial interface (DSI) standardized by a Mobile Industry Processor Interface (MIPI) or an embedded display port (eDP) standardized by a Video Electronics Standards Association (VESA) and compressed display data generated by the compression algorithm is transmitted over the display interface, wherein at least one of a first complexity and a first compression efficiency of the compression algorithm is compliant with at least one corresponding characteristic of the de-compression algorithm, and wherein the display interface is not a network interface, and the display interface is coupled between a data processing apparatus implementing the data processing method and the another data processing apparatus that are located on different chips.

29. A data processing method comprising:

receiving an input bitstream from another data processing apparatus via a display interface, and un-packing the input bitstream into an input display data, wherein the display interface is a display serial interface (DSI) standardized by a Mobile Industry Processor Interface (MIPI) or an embedded display port (eDP) standardized by a Video Electronics Standards Association (VESA);

adaptively adjusting a de-compression algorithm according to a compression algorithm employed by the another data processing apparatus; and when the input display data is a compressed display data, generating a de-compressed display data according to the input display data and the de-compression algorithm;

wherein compressed display data to be decompressed by the de-compression algorithm is transmitted over the display interface and received from the display interface, wherein at least one characteristic of the de-compression algorithm is compliant with a corresponding one of a first complexity and a first compression efficiency of the compression algorithm, and wherein the display interface is not a network interface, and the display interface is coupled between a data processing apparatus implementing the data processing method and the another data processing apparatus that are located on different chips.

* * * * *